(12) United States Patent
Brenk

(10) Patent No.: US 8,471,071 B2
(45) Date of Patent: Jun. 25, 2013

(54) SILVER CATALYST FOR FORMALDEHYDE PREPARATION

(75) Inventor: Marco Brenk, Kaempfelbach (DE)

(73) Assignee: Allgemeine Gold-und Silberscheideanstalt AG, Pforzheim (DE)

( * ) Notice: Subject to any disclaimer, the term of this patent is extended or adjusted under 35 U.S.C. 154(b) by 98 days.

(21) Appl. No.: 13/061,348

(22) PCT Filed: Aug. 26, 2009

(86) PCT No.: PCT/EP2009/006170
§ 371 (c)(1),
(2), (4) Date: Mar. 1, 2011

(87) PCT Pub. No.: WO2010/022923
PCT Pub. Date: Mar. 4, 2010

(65) Prior Publication Data
US 2011/0201843 A1    Aug. 18, 2011

(30) Foreign Application Priority Data

Sep. 1, 2008  (DE) .......................... 10 2008 045 148

(51) Int. Cl.
C07C 45/00    (2006.01)
B01J 21/06    (2006.01)
B01J 21/02    (2006.01)
B01J 37/02    (2006.01)
B01J 37/08    (2006.01)
B01J 35/02    (2006.01)

(52) U.S. Cl.
USPC ............ 568/449; 502/244; 502/347; 502/348

(58) Field of Classification Search
USPC ........................... 568/449; 502/243, 347, 348
See application file for complete search history.

(56) References Cited

U.S. PATENT DOCUMENTS

| 6,368,378 | B2 | 4/2002 | Sasaki |
| 6,994,948 | B2 | 2/2006 | Glicksman et al. |
| 2001/0004857 | A1 | 6/2001 | Sasaki |
| 2006/0167147 | A1 | 7/2006 | Asgari |
| 2006/0192183 | A1 | 8/2006 | Klyszcz et al. |
| 2008/0103219 | A1 | 5/2008 | Petruska et al. |
| 2008/0193746 | A1 | 8/2008 | Beaurain et al. |
| 2010/0021634 | A1 | 1/2010 | Kodas et al. |
| 2010/0151267 | A1 | 6/2010 | Kodas et al. |

FOREIGN PATENT DOCUMENTS

| EP | 1 110 647 A2 | 6/2001 |
| EP | 1110647 A2 | 6/2001 |
| EP | 1 696 006 A1 | 8/2006 |
| EP | 1696006 A1 | 8/2006 |
| WO | 2007/149883 A1 | 12/2007 |

OTHER PUBLICATIONS

English language version of International Search Report for PCT/EP2009/006170 mailed Jan. 22, 1010.
Office Action received in RU 2011 112 015, mailed Jan. 29, 2013. English translation provided.

*Primary Examiner* — Sikarl Witherspoon
(74) *Attorney, Agent, or Firm* — Smith, Gambrell & Russell, LLP

(57) ABSTRACT

The present invention relates to a process for producing coated silver catalysts. The invention further addresses the silver catalysts themselves and the advantageous use thereof in formaldehyde synthesis.

10 Claims, 2 Drawing Sheets

SILVER CATALYST FOR FORMALDEHYDE PREPARATION

FIELD OF THE INVENTION

The present invention relates to a process for producing coated silver catalysts. The invention further addresses the silver catalysts themselves and the advantageous use thereof in formaldehyde synthesis.

BACKGROUND OF THE INVENTION

Formaldehyde (FA) is one of the most important commodity chemicals; the production in the EU in 2002 was more than 3 million tonnes; double the amount is likely to have been produced worldwide (5.3 million tonnes (1989)) [K. Weissermel, H.-J. Arpe, Industrielle Organische Chemie, VCH, 1994]. FA is required especially for the production of various resins (phenol, melamine, etc.) and polymers. The synthesis proceeds virtually exclusively from methanol [K. Weissermel, H.-J. Arpe, Industrielle Organische Chemie, VCH, 1994; M. Qian, M. A. Liauw, G. Emig, Appl. Catal. A: General, 238 (2003) 211], although the direct synthesis from methane has also been studied [H. Berndt, A. Martin, A. Brückner, E. Schreier, D. Müller, H. Kosslick, G.-U. Wolf, B. Lücke, J. Catal., 191 (2000) 384]. The synthesis from methanol is effected either by dehydrogenation or partial oxidation. While the dehydrogenation (Eq. 1) proceeds endothermically (+84 kJ/mol), the partial oxidation (Eq. 2) is strongly exothermic (−159 kJ/mol).

$$CH_3OH \rightleftharpoons HCHO + H_2 \qquad \text{Eq. 1}$$

$$CH_3OH + 0.5 O_2 \rightarrow HCHO + H_2O \qquad \text{Eq. 2}$$

The partial oxidation is performed in two different processes with different catalysts. The main distinguishing features are firstly the different catalysts but secondly the observance of the explosion limits of MeOH in air.

In the air deficiency or silver contact process (BASF, Borden, Bayer, Degussa, ICI, Celanese, DuPont, Mitsubishi, Mitsui, plant sizes: 80-135 kt/a of FA), MeOH contents of >37.5% by volume are employed. In the air excess, molybdate or FORMOX process (Lummus, Montecatini, Hiag/Lurgi, Perstorp/Reichsdorf, plant sizes: 20-30 kt/a of FA), the process is conducted at MeOH contents of <7% by volume. About 80% of all plants operate by the air deficiency or silver contact process; approx. 55% of FA production in Western Europe is based on the silver contact process [M. Qian, M. A. Liauw, G. Emig, Appl. Catal. A: General, 238 (2003) 211; Catalysis from A to Z, VCH Wiley, 2000, p. 224].

Partial oxidation by the air deficiency process is performed principally in two variants: (i) MeOH ballast process (e.g. Degussa, ICI) and (ii) the water ballast process (BASF). Whereas an incomplete conversion is achieved in the first process, in which only MeOH and air are used, a virtually full conversion can be achieved in the second process with additional metering of steam. It is normal to operate with an MeOH/H$_2$O mixture of 60/40.

The currently available processes, however, are all affected by the fact that the silver catalyst is caking relatively rapidly at the reaction temperatures and it becomes ever more difficult for the gases to be introduced to flow through the catalyst bed. When the expenditure at this point becomes too great, the formaldehyde plant has to be shut down and the catalyst replaced, which leads to costly production shutdowns. The high heat capacity of water achieves homogeneous distribution of heat in the water ballast process and protects the catalyst from excessively rapid "sintering". Moreover, the steam helps to prevent or to minimize coke formation. For these reasons, the lifetime of the silver catalyst in the water ballast process is significantly higher than in the methanol ballast process, though a further increase in service life would be desirable (WO 0130492)

It is known in principle to produce nanoparticulate silver-platinum alloys which have a coating of porous silica gel (Ultra-thin porous silica coated silver-platinum alloy nanoparticle as a new catalyst precursor, Kai Man K. Yu, David Thompsett, Shik Chi Tsang, Chem. Commun., 2003, (13), 1522-1523). However, such nanoparticles are unsuitable for formaldehyde synthesis, since they have much too high a bulk density and it would thus be very difficult for the gases to be converted to flow through them when used in the catalyst bed.

SUMMARY OF THE INVENTION

It is therefore an object of the present invention to specify a process for producing silver crystals and to specify the silver crystals themselves, which have a service life improved over the prior art crystals in formaldehyde synthesis by the water ballast process. At the same time, other parameters such as space-time yield, speed of catalyst exchange and activity should not be adversely affected.

The object is achieved in accordance with the claims.

DETAILED DESCRIPTION OF THE INVENTION

Figure 1:
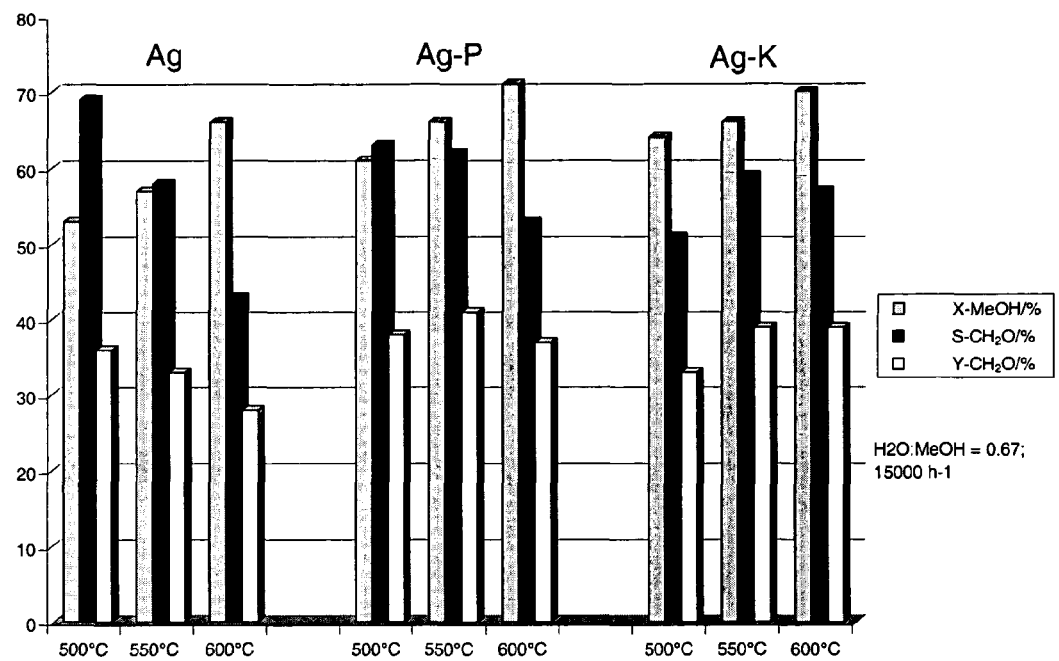
FIG. 1 is a graphical representation showing methanol conversion and formaldehyde selectivity and yield as a function of reaction temperature for three catalyst specimens: pure silver (Ag); Ag modified with polymer-based aluminum oxide (Ag—P); and Ag modified with colloid-based aluminum oxide (Ag—K).

By virtue of proceeding, in a process for producing silver crystals with a thin porous coating of oxidic material of the elements selected from the group consisting of aluminium, silicon, zirconium, titanium and mixtures thereof, in such a way that
a) the silver crystals are contacted with a sol-gel solution of the elements in question, and
b) the resulting silver crystals are collected,
c) freed of the organic solvent and
d) then heat treated at a temperature between 50° C. and the melting point of silver, the solution to the stated problem is arrived at in a manner which is simple but no less advantageous for that. In spite of the coating, the resulting silver catalysts are equally active as well as selective and lead to space-time yields just as good as the original used silver crystals without corresponding coating. At the same time, the coating, however, helps to counteract the sintering of the silver crystals, which leads to a significantly increased service life of the catalysts and hence to a dramatic cost reduction through absence of catalyst exchange. Moreover, it is completely surprising that the catalyst exchange itself can be managed more easily, since the material to be exchanged is not caked but can be removed readily from the reactor compared to the conventional material.

In the present process, in step a), the silver crystals are contacted with a sol-gel solution of the elements in question. This is preferably done by simply wetting the crystals with the appropriate solution. Advantageously, step a) is performed in a solvent comprising an organic solvent. The crystals can preferably also be introduced into a vessel/reactor which contains the sol-gel solution, optionally while stirring. The addition can also be reversed. Advantageously, the sol-gel solution is one in which alkoxides of the elements in question are dissolved in an organic matrix. The alkoxides may, as a result of hydrolysis, already be partly crosslinked and may therefore be present in colloidally dissolved form. To stabilize the solution, specific additives can be added.

As indicated, the sol-gel solution is preferably used in the form of an organic medium. The person skilled in the art is aware which solutions are preferable here. However, particular preference is given to an embodiment in which the solvents used are alcohols. Very particularly preferred solvents may be those selected from the group consisting of methanol, ethanol, n-propanol, isopropanol, n-butanol, isobutanol, sec-butanol, tert-butanol, n-pentanol and the bonding isomers thereof and the mixtures thereof. It is possible to add further organic solvents to the sol-gel solution, for example ethers.

An exceptionally preferred embodiment is that in which the sol-gel solution selected is an alkoxide of the element in question in the corresponding alcohol as the organic solvent. Therefore, very particularly preferred alkoxide compounds of the element in question are those selected from the group of the methoxides, ethoxides, propoxides, isopropoxides, n-butoxides, sec-butoxides, isobutoxides, tert-butoxides, n-propoxides or the bonding isomers thereof and mixtures thereof.

Next, the silver crystals are collected and thus freed of excess sol-gel solution. The collection can be performed by simple filtering, decanting or similar measures. Subsequently, excess solvent still adhering to the silver crystals is removed. This can be done in a simple manner by removing the solvent from the resulting silver crystals by evaporating it off under ambient conditions. Further measures are familiar to those skilled in the art. In particular, the solvent can also be removed in an accelerated manner by additional measures, for example application of a vacuum, exposure to a gas stream (air, nitrogen) and the like.

In the optional final step, the resulting silver crystals are heat treated at a temperature between 50° C. and the melting point of silver.

This is preferably done at a temperature between 300° C. and 700° C., most preferably at 400° C. to 600° C. The heat treatment can be performed with application of a vacuum or in the presence of an oxidic atmosphere, advantageously air.

The silver crystals thus obtained can be used for formaldehyde production in this form or optionally after further process measures as specified above.

In a further configuration of the present invention, the invention therefore relates to silver crystals with a thin porous coating of oxidic material of the elements selected from the group consisting of aluminium, silicon, zirconium, tin, titanium and mixtures thereof, obtainable by the process according to the invention.

Silver crystals for the formaldehyde synthesis must have a particular shape in order to be able to be used successfully as catalysts. They cannot be too small, since too little cavity otherwise remains between the individual crystals for the gases to be converted to flow through. Blockage of the catalyst bed would be the consequence. On the other hand, the particle sizes of the crystals should not become too great since an unfavourable ratio between expensive catalyst material and surface area is otherwise the result. It has been found to be advantageous when the mean particle size distribution is 0.15 to 2.5 mm, more preferably 0.5 to 2.0 mm and most preferably 0.5 to 1.0 mm.

The coating of the silver crystals serves—as already indicated—to prevent the silver crystals from sintering together in the catalyst bed in the formaldehyde synthesis. The coating must have an appropriate thickness to be able to ensure this effect sufficiently. The coating should therefore as far as possible have a thickness of not less than 0.3 µm. On the other hand, it can be assumed that too great a thickness of the coating does not appear to be advantageous from the point of view of adhesion and of attrition. The thickness of the coating should therefore be between 0.3 µm-10 µm. A preferred thickness is 1.0-5.0 µm, more preferably 2.0-4.0 µm and most preferably around 3.0 µm.

The coating consists of an oxidic material of the contemplated elements. According to the invention, such a material is interpreted as being an inorganic compound which comprises the elements addressed, these being present bonded to one another via oxygen atoms within the entire material or at least in predominant portions. The oxidic material thus preferably comprises various types of $SiO_2$, aluminium oxides (e.g. α-, β-, γ-$Al_2O_3$, boehmite, etc.), $TiO_2$, $ZrO_2$, a mixture of oxides or mixed oxides of these compounds, for example various kinds of zeolites, SAPOs, perovskites, spinels and the like. The coating may also be present in the form of a ceramic.

The inventive catalyst should advantageously have a particular bulk density. This should be between >1700 and <3800 g/l, preferably >1700 and <2400 g/l and most preferably between >1700 and <2000 g/l.

The present invention also further relates to the use of the silver crystals coated in accordance with the invention as catalysts for formaldehyde preparation.

For this application, e.g. the formaldehyde synthesis, the silver crystals should possess a purity of >99.9%, preferably >99.99%. The elements which may be present in ultrasmall amounts in the silver crystals have been found to be those selected from the group consisting of gold, bismuth, copper, iron, lead, palladium and platinum. The amounts of these elements are less than 100 ppm, preferably <50 ppm and very preferably <30 ppm.

The coating of the silver crystals at least crucially delays sintering-together of the crystals during the formaldehyde synthesis. The crystals can also—when an exchange of the catalyst is planned—be removed from the reactor significantly more readily, since the caking of the crystals is less marked. The coating effectively imparts an exoskeleton to the silver crystals, which significantly prolongs the service life of the catalyst bed in the formaldehyde synthesis and hence counteracts frequent catalyst exchange. Since the exchange of the catalyst and the production shutdown that this causes concerns a majority of the costs of the formaldehyde production, the present invention helps to be able to perform the formaldehyde synthesis significantly less expensively.

Figure 2:
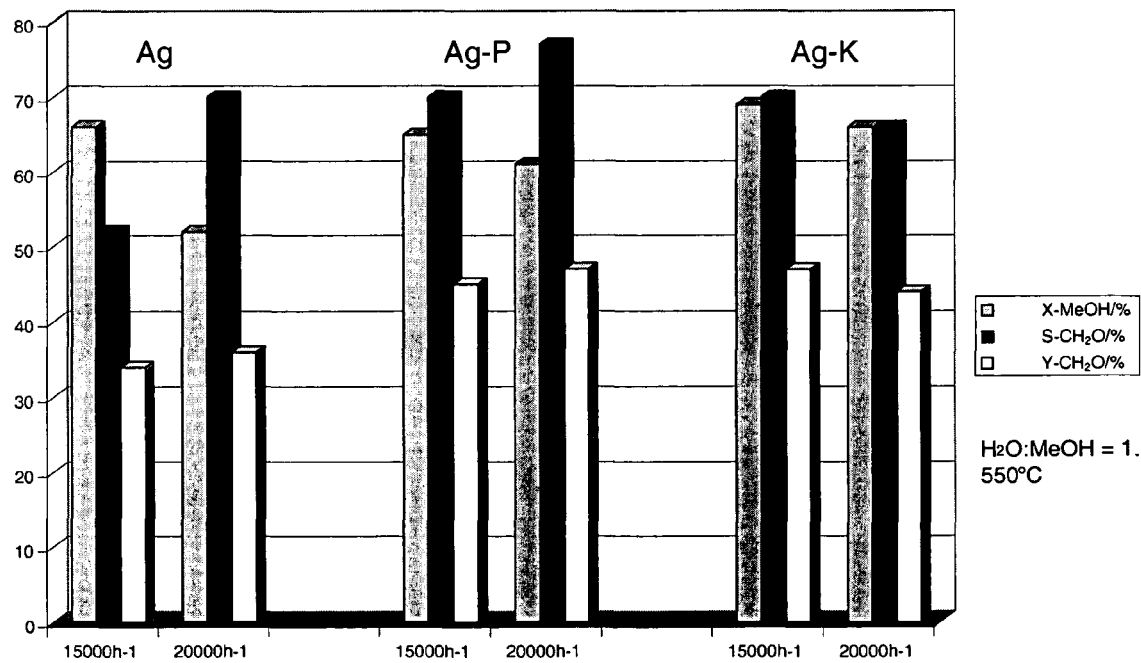
FIG. 2 is a graphical representation showing methanol conversion and formaldehyde selectivity and yield as a function of space velocity for the three catalyst specimens: Ag; Ag—P; and Ag—K.

Tests have demonstrated that the yields with the novel catalysts are surprisingly not significantly poorer than with the originally used silver catalysts (FIG. 1, FIG. 2).

EXAMPLES

Production of the Catalysts

The Ag crystals are coated with a ceramic γ-$Al_2O_3$ layer by means of a colloidal boehmite (AlOOH) sol or of a polymeric $Al_2O_3$ sol.

The characteristic feature of colloidal sols is dispersed ultrasmall particles in the region of 1 nm which statically repel one another owing to surface charges. For the preparation of the colloidal boehmite sol, aluminium tri-sec-butoxide (ATSB) is diluted with 2-butanol and added dropwise to water acidified with nitric acid. The hydrolysis which takes place proceeds with a water excess. The 2-butanol which forms is subsequently distilled off. The conversion to the boehmite with simultaneous stabilization of the sol takes place as a result of boiling under reflux at 120° C. A clear sol which shimmers in a pale bluish colour is obtained.

For polymeric sols, metal alkoxides likewise serve as the precursor material. The polymeric aluminium oxide sol is therefore likewise prepared from isopropanol-diluted aluminium tri-sec-butoxide (ATSB). In contrast to the preparation of colloidal sols, only a small amount of water is supplied here, which leads to partial hydrolysis and prevents the precipitation of the hydroxides. The partially hydrolyzed alkoxides condense with elimination of water to form polymers. Complete hydrolysis is prevented by adding complexing agents such as acetyl acetone. Stirring with exclusion of air and addition of nitric acid stabilizes the sol. A clear sol is formed.

The sols obtained are used to coat the Ag crystals by means of dipping or spraying. This is followed by the drying of the crystals on a meshlike substrate at moisture contents of >50% and temperatures between 25 and 100° C. This converts the sol to a gel; the nanoparticles are crosslinked three-dimensionally. By sintering the coated crystals in ceramic crucibles at 500° C. with a hold time of 3 hours, a ceramic coating is formed from the gel layer on the Ag crystals.

Activity Tests

Figure 3:
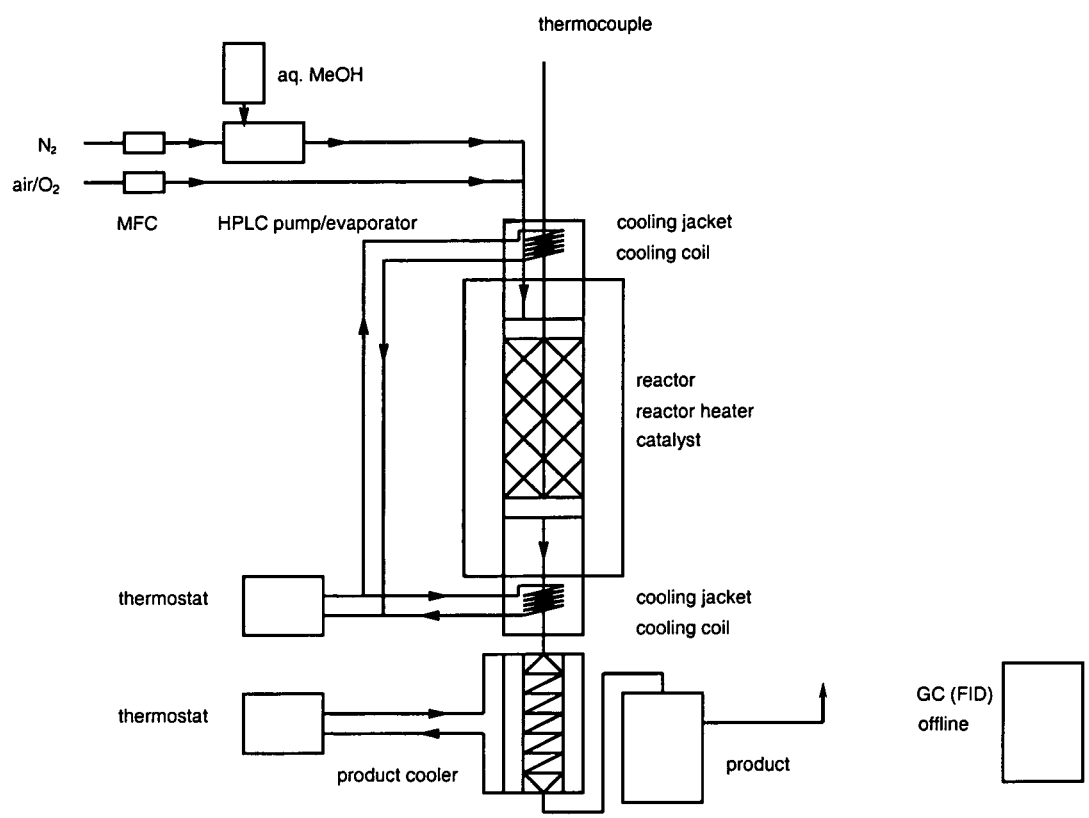
FIG. 3 is a schematic diagram of an apparatus used to perform the catalytic activity tests of FIG. 1 and FIG. 2.

An apparatus as shown in FIG. 3 was used to perform activity tests.

$N_2$ and air/$O_2$ were metered in with MFCs (MultiFlowControllers), which had been calibrated beforehand by means of a soap film meter. For checking, the gas streams were also measured later after passing through the unheated reactor. The liquid was metered in by means of an HPLC pump with an upstream degasser. The $H_2O$/MeOH mixtures were established via starting weights. To calculate the liquid volume to be metered in (ml/min), additive behaviour of the densities of the components was initially assumed for the density of the mixtures. After the testing had finished, the amount of liquid injected was checked with reference to the change in weight of the liquid reservoir. Accordingly, a correction of the amount of MeOH metered in was effected for the calculation of the MeOH conversion (X-MeOH), but also the percentages by volume of all feed components and the GHSV (GasHourlySpaceVelocity).

The reactor used was an ALSINT 99.7 ceramic tube; external diameter 15 mm, internal diameter 10 mm, length 500 mm (from Haldenwanger Berlin (BTK—Buntenkötter Technische Keramik, Neuss)). Reactor inlet and outlet were kept at about 120° C. by means of water cooling (cooling coils). The thermostat box (120° C.) ensures that formaldehyde does not polymerize before the product stream is introduced into the condenser and into the collecting vessel for the product samples. The liquid reactant was evaporated at 120° C. in an evaporator connected upstream of the reactor. The reactor temperature was regulated to the temperature desired in the catalyst bed, which was measured in the middle of the catalyst bed. It had to be readjusted in the event of changes in the liquid feed rate and composition. After leaving the reactor and the thermobox, the product gas was cooled to approx. 5° C. in a spiral condenser and transferred into the sample withdrawal point which was likewise cooled.

The catalyst bed consisted in each case of 0.1 g of Ag catalyst of particle fraction 0.5-1 mm, mixed with 3 g of 1-1.4 mm white high-grade corundum (in analogy to [M. Qian, M. A. Liauw, G. Emig, Appl. Catal. A: General, 238 (2003) 211.]). The volume of the bed was 2.3 ml (basis of the GHSV calculation). To preheat the feed on the inlet side, an additional high-grade corundum bed was layered over the catalyst bed. Three catalyst specimens were tested: Cat. 1: "Pure silver" (Ag), Cat. 2: Ag modified with polymer-based aluminium oxide (aluminium hydroxide precursor—inventive) (Ag—P), Cat. 3: Ag modified with colloid-based aluminium oxide (aluminium sol precursor—inventive) (Ag—K).

The gas chromatography analyses were effected with a Shimadzu GC 17A using an AT-Q 30 m×0.32 mm capillary column and an FID with upstream methanizer. Specifically, the following conditions were employed:

Injection volume 0.9 μl, split 40, linear velocity 30.9 cm/s, temperature program 6 min isothermal 120° C., 10 K/min to 200° C., hold time 1 min, 5 injections each per sample. The capillary GC column was operated at start temperature 120° C., in order to prevent polymerization of formaldehyde or methylal formation with MeOH.

Tests were conducted at 500-600° C. and space velocities of 6000-20 000 $h^{-1}$; the MeOH:water ratio was 0.67 or 1.2. The MeOH conversions reach approx. 70% at 600° C.; the FA yields are 35-40%. At low loadings or high residence times, a high FA decomposition rate was observed; CO was the main product.

The details of the tests can be taken from the following tables:

TABLE 1

Test procedure of the catalyst initialization and the subsequent catalytic testing

| Procedure | t/h | T/° C. | GHSV/h−1 (25° C.) | H2O:MeOH Molar ratio |
|---|---|---|---|---|
| Reactor heating, N2 | | 5 K/min to 200 | | |
| Startup with feed | | 5 K/min to 600 | 15000 | |
| Catalyst initialization | 0-65 | 600 | 15000 | 0.67 |
| Test I | 0-3 | 600 | 15000 | 0.67 |
| Change in residence time | 3-4.5 | 600 | 6000 | 0.67 |
| Test II | 4.5-7.5 | 600 | 6000 | 0.67 |
| Change in T | 7.5-24 | 500 | 6000 | 0.67 |
| Test III | 24-27 | 500 | 6000 | 0.67 |
| Change in residence time | 27-28.5 | 500 | 15000 | 0.67 |
| Test IV | 28.5-31.5 | 500 | 15000 | 0.67 |
| Change in T | 31.5-48 | 550 | 15000 | 0.67 |
| Test V | 48-51 | 550 | 15000 | 0.67 |
| Change in residence time | 51-52.5 | 550 | 6000 | 0.67 |
| Test VI | 52.5-55.5 | 550 | 6000 | 0.67 |
| Change in residence time Increase in H2O ballast | 55.5-72 | 550 | 15000 | 1.20 |
| Test VII | 72-75 | 550 | 15000 | 1.20 |
| Change in residence time | 75-76.5 | 550 | 20000 | 1.20 |
| Test VIII | 76.5-79.5 | 550 | 20000 | 1.20 |

TABLE 2

Test parameters

| Test | N2 | H$_2$O | MeOH | O$_2$ | GHSV/h−1 (25° C.) | Residence time (823 K) |
|---|---|---|---|---|---|---|
| I, IV, V | 22.00 l/h | 4.05 l/h<br>11.7% by vol.<br>H2O:MeOH = 0.67<br>Liquid reactant I:<br>0.234 ml/min<br>226.1 g H2O +<br>600 g MeOH | 6.04 l/h<br>17.5% by vol.<br>8.57 g/h<br>0.268 mol/h | 2.425 l/h<br>7.0% by vol. | 15000 | 0.087 sec |
| II, III, VI | 8.80 l/h | Liquid reactant I:<br>0.094 ml/min | 0.107 mol/h | 0.968 l/h<br>7.0% by vol. | 6000 | 0.217 sec |
| VII | 18.83 l/h | 7.25 l/h<br>21.0% by vol.<br>H2O:MeOH = 1.2<br>Liquid reactant II:<br>0.277 ml/min<br>405.0 g H2O +<br>600 g MeOH | 0.268 mol/h | 2.415 l/h<br>7.0% by vol. | 15000 | 0.087 sec |
| VIII | 25.04 l/h | 9.64 l/h<br>21.0% by vol.<br>H2O:MeOH = 1.2<br>Liquid reactant II:<br>0.368 ml/min | 0.356 mol/h | 3.218 l/h<br>7.0% by vol. | 20000 | 0.065 sec |

TABLE 3

Real parameters 1 (Cat. 1 = Ag (reference), Cat. 2 (Ag—P), Cat. 3 (Ag—K))

| | Test I. IV. V; Cat. 1; 2; 3 Target | Actual | Test II. III. VI; Cat. 1; 2 Target | Actual | Cat. 3; Test II Actual | Test III Actual | Test VI Actual |
|---|---|---|---|---|---|---|---|
| N2 | 22.0 l/h | 22.3 l/h | 8.8 l/h | 9.27 l/h | | | |
| O2 | 2.42 l/h<br>7.0% by vol. | 2.37 l/h<br>6.74% by vol. | 0.97 l/h<br>7.0% by vol. | 0.90 l/h<br>6.27% by vol. | | | |
| Liquid reactant | 0.234 ml/min | 0.243 ml/min | 0.094 ml/min | 0.100 ml/min | | | |
| MeOH | 6.04 l/h<br>17.5% by vol.<br>0.268 mol/h | 6.28 l/h<br>17.86% by vol.<br>0.279 mol/h | 2.53 l/h<br>17.5% by vol.<br>0.107 mol/h | 2.42 l/h<br>17.54% by vol.<br>0.113 mol/h | 0.111 mol/h | 0.112 mol/h | 0.115 mol/h |
| H2O | 4.05 l/h<br>11.7% by vol. | 4.21 l/h<br>11.97% by vol. | 1.62 l/h<br>11.7% by vol. | 1.72 l/h<br>11.93% by vol. | | | |
| GHSV | 15 000 h$^{-1}$ | 15300 h$^{-1}$ | 6000 h$^{-1}$ | 6265 h$^{-1}$ | | | |
| Residence time | 0.087 sec | 0.085 sec | 0.217 sec | 0.208 sec | | | |

TABLE 4

Real parameters 2 (Cat. 1 = Ag (reference), Cat. 2 (Ag—P), Cat. 3 (Ag—K))

| | Test VII; Cat. 1; 2 Target | Actual | Cat. 3 Actual | Test VIII; Cat. 1; 2 Target | Actual | Cat. 3 Actual |
|---|---|---|---|---|---|---|
| N$_2$ | 18.83 l/h | 19.10 l/h | | 25.04 l/h | 23.70 l/h | |
| O$_2$ | 2.42 l/h<br>7.0% by vol. | 2.30 l/h<br>6.53% by vol. | | 3.32 l/h<br>7.0% by vol. | 3.60 l/h<br>7.86% by vol. | |
| Liquid reactant | 0.277 ml/min | 0.288 ml/min | | 0.368 ml/min | 0.386 ml/min | |
| MeOH | 6.04 l/h<br>17.5% by vol.<br>0.268 mol/h | 6.31 l/h<br>17.83% by vol.<br>0.280 mol/h | 0.276 mol/h | 7.97 l/h<br>17.5% by vol.<br>0.356 mol/h | 8.37 l/h<br>18.27% by vol.<br>0.374 mol/h | 0.375 mol/h |
| H$_2$O | 7.25 l/h<br>21.0% by vol. | 7.57 l/h<br>21.41% by vol. | | 9.64 l/h<br>21.0% by vol. | 10.12 l/h<br>22.10% by vol. | |
| GHSV | 15 000 h-1 | 15 300 h-1 | | 20 000 h-1 | 20 000 h-1 | |

TABLE 4-continued

Real parameters 2 (Cat. 1 = Ag (reference), Cat. 2 (Ag—P), Cat. 3 (Ag—K))

|  | Test VII;<br>Cat. 1; 2<br>Target | Actual | Cat. 3<br>Actual | Test VIII;<br>Cat. 1; 2<br>Target | Actual | Cat. 3<br>Actual |
|---|---|---|---|---|---|---|
| Residence time | 0.087 sec | 0.085 sec |  | 0.065 sec | 0.065 sec |  |

Under all reaction conditions employed, surprisingly, no significantly poorer yields and methanol conversions were obtained with the Ag catalysts whose surface was modified with aluminium oxide deposits (Ag—P and Ag—K).

FIGS. 1 and 2 show the MeOH conversions and FA yields as a function of the reaction temperature and of the space velocity.

FIG. 1: MeOH conversion and FA selectivity or yield vs. reaction temperature

FIG. 2: MeOH conversion and FA selectivity or yield vs. loading

X-MeOH: MeOH conversion [%]
S-FA: Formaldehyde selectivity [%]
Y-FA: Formaldehyde yield [%]

The invention claimed is:

1. A process for producing silver crystals having a thin porous coating of oxidic material of the elements selected from the group consisting of aluminium, silicon, zirconium, titanium and mixtures thereof, which comprises
   a) contacting the silver crystals with a sol-gel solution of the elements in question in an organic solvent, and
   b) collecting the silver crystals resulting from step a),
   c) freeing the silver crystals from the organic solvent, and
   d) then heat treating the silver crystals at a temperature between 50° C. and the melting point of silver,
   wherein the silver crystals have a mean particle size distribution of 0.15 mm to 2.5 mm.

2. The process according to claim 1, wherein the sol-gel solution is an alkoxide of the element in question in the corresponding alcohol as the organic solvent.

3. The process according to claim 2, wherein the alkoxide is selected from the group consisting of methoxides, ethoxides, propoxides, isopropoxides, n-butoxides, sec-butoxides, isobutoxides, tert-butoxides, n-propoxides, and structural isomers thereof.

4. The process according to claim 1, wherein the resulting silver crystals are freed of the solvent by allowing the solvent to evaporate off under ambient conditions.

5. The process according to claim 1, wherein the heat treatment is performed at a temperature between 400° C. and 800° C.

6. Silver crystals having a mean particle size distribution of 0.15 mm to 2.5 mm and a thin porous coating of oxidic material of the elements selected from the group consisting of aluminium, silicon, zirconium, tin, titanium, and mixtures thereof made by the process of claim 1.

7. The silver crystals according to claim 6, wherein the coating has a thickness of 0.3 μm-10 μm.

8. The silver crystals according to claim 6, wherein the oxidic material is selected from the group of $SiO_2$, various kinds of aluminium oxides, $TiO_2$, $ZrO_2$, a mixture of oxides or mixed oxides of these compounds, optionally in the form of a ceramic.

9. A catalyst comprising silver crystals according to claim 6 with a bulk density between >1700 g/l and <3800 g/l.

10. A method of preparing formaldehyde which comprises using the silver crystals according to claim 6 as a catalyst.

* * * * *